United States Patent
Jiang

(10) Patent No.: US 11,582,853 B2
(45) Date of Patent: Feb. 14, 2023

(54) CONTROL SYSTEM AND METHOD FOR STAGE LIGHT FIXTURE WITH PHOTOBIOLOGICAL SAFETY

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

(*) Notice: Subject to any disclaimer, the term of this patent is extended or adjusted under 35 U.S.C. 154(b) by 0 days.

(21) Appl. No.: 17/333,247

(22) Filed: May 28, 2021

(65) Prior Publication Data
US 2021/0298156 A1    Sep. 23, 2021

Related U.S. Application Data

(63) Continuation of application No. PCT/CN2020/096472, filed on Jun. 17, 2020.

(30) Foreign Application Priority Data

Jul. 25, 2019    (CN) .......................... 201910676697.7

(51) Int. Cl.
*H05B 47/115*    (2020.01)
*F21V 21/15*    (2006.01)
(Continued)

(52) U.S. Cl.
CPC ............ *H05B 47/115* (2020.01); *F21V 21/15* (2013.01); *F21V 23/0471* (2013.01); *F21W 2131/406* (2013.01)

(58) Field of Classification Search
CPC ... H05B 47/115; F21V 21/28; F21V 23/0471; F21W 2131/06; G01M 11/02; G01M 11/0228
See application file for complete search history.

(56) References Cited

U.S. PATENT DOCUMENTS

2017/0074497 A1* 3/2017 Jurik ..................... F21V 7/0091
2019/0022263 A1* 1/2019 Quilici ................... H05B 45/10
2020/0309335 A1* 10/2020 Quadri ................... F21V 21/30

FOREIGN PATENT DOCUMENTS

CN    203785788 U    8/2014
CN    104331606 A    2/2015
(Continued)

OTHER PUBLICATIONS

CN107543607A—Machine Translation. (Year: 2018).*
(Continued)

*Primary Examiner* — Alexander H Taningco
*Assistant Examiner* — Pedro C Fernandez
(74) *Attorney, Agent, or Firm* — Lerner, David, Littenberg, Krumholz & Mentlik, LLP

(57) ABSTRACT

The control system for a stage light fixture with photobiological safety includes a control unit connected to a motor assembly and a light source and configured to control the stage light fixture to operate, and a distance sensor connected to the control unit, and configured to acquire an instant distance from a living being to the stage light fixture. The control unit stores a light radiation hazard exposure radiance limit value and a light fixture irradiance value acquired in advance per unit of time and distance, and acquires a parameter of the living being entering an irradiation danger zone according to the instant distance, the light radiation hazard exposure radiance limit value, and the light fixture irradiance value. When a hazard condition reaches the parameter of the living being entering the irradiation danger zone, the control unit controls the stage light fixture to move to eliminate the hazard condition.

10 Claims, 2 Drawing Sheets

(51) Int. Cl.
*F21V 23/04* (2006.01)
*F21W 131/406* (2006.01)

(56) References Cited

FOREIGN PATENT DOCUMENTS

| | | |
|---|---|---|
| CN | 105841930 A | 8/2016 |
| CN | 106287434 A | 1/2017 |
| CN | 107543607 A | 1/2018 |
| CN | 110418462 A | 11/2019 |
| JP | 2009283183 A | 12/2009 |

OTHER PUBLICATIONS

CN106287434A—Machine Translation. (Year: 2017).*
International Search Report for Application No. PCT/CN2020/096472, dated Sep. 25, 2020, 3 pages.

* cited by examiner

·············· Shortest distance (m) from irradiated object

CONTROL SYSTEM AND METHOD FOR STAGE LIGHT FIXTURE WITH PHOTOBIOLOGICAL SAFETY

CROSS REFERENCE TO RELATED APPLICATIONS

The present application is a continuation of International Application No. PCT/CN2020/096472, filed on Jun. 17, 2020, which claims priorities from Chinese Patent Application No. 201910676697.7 filed on Jul. 25, 2019, all of which are hereby incorporated herein by reference.

TECHNICAL FIELD

The present invention relates to the technical field of stage light fixtures, and more particularly to a control system and method for a stage light fixture with photobiological safety.

BACKGROUND

In recent years, with the rapid development of lighting technologies, more and more new light sources are used by stage light fixtures, and an LED new light source is currently applied to a large number of lighting fields of stage lighting. The LED light source has characteristics of high luminous efficiency, low calorific value, long life, operational stability, instant lighting, and the switch that controls the LED light source has no influence on the life thereof. The LED light source is particularly suitable for lighting changes in stage light fixtures and frequent switches. The power of current LED light source becomes increasingly higher, and the performance of LED has a prospect for continuous improvement with constant development of science and production technology.

However, LED also has some disadvantages in the field of lighting applications, such as blue light hazards, which refers to that a photochemical effect, caused by exposure to radiation having a wavelength mainly between 400 nm and 500 nm, leads to hazards that result in retinal damage. If irradiation time exceeds 10 s, this damage mechanism takes a leading role, which is several times higher than a thermal damage mechanism. Since human eyes are insensitive to blue light radiation, unlike cases in which human eyes may naturally contract pupils and close the eyes for self-protection against other visible and strong light, people are susceptible to the hazards of blue light exceeding a radiant exposure limit value. After the LED is energized, a P-N junction excited by a current will also contain some radiation harmful to the human body while emitting visible light.

For the hazards described above, it tends to label the exterior of a light fixture with a warning sign so as to notify users of a safety distance, as shown in FIG. 4. However, this approach has serious limitation. Usage area of stage lighting is often crowded, audiences and performers often fail to see subtle safety-distance warning labels on the light fixtures, thus they are unknowingly exposed to close-range irradiation for more than a certain period of time and injury accidents may occur, which leads to very serious consequences.

SUMMARY

The present invention thus provides control system for a stage light fixture with photobiological safety, which transforms a passive light pollution defense of "label warning" in the prior art into an autonomous regulatory defense so as to avoid effects and hazards of artificial light sources on human health.

According to the present invention, the control system for a stage light fixture with photobiological safety includes: a control unit, and a distance sensor connected to the control unit. the stage light fixture includes a light head within which a light source is provided, and a motor assembly for driving the light head to change an illumination position. The control unit is connected to the motor assembly and the light source and is used to control the stage light fixture to operate. The distance sensor is provided on the light head and used to acquire an instant distance d from a living being to the stage light fixture. The control unit stores a light radiation hazard exposure radiance limit value $E_{harm}$ and a light fixture irradiance value $E_S$ acquired in advance per unit of time and distance; and the control unit acquires a parameter of the living being entering an irradiation danger zone according to the instant distance d, the light radiation hazard exposure radiance limit value $E_{harm}$, and the light fixture irradiance value $E_S$. The control unit controls the stage light fixture to move so as to eliminate the hazards when a hazard condition reaches the parameter of the living being entering the irradiation danger zone.

The control system according to the present invention can also be applied to LED lights, laser lights, and searchlights so as to avoid effects and hazards of artificial light sources on human health. The light head can change the illumination position by rotation or translation of the light head. The instant distance d from the living being to the stage light fixture acquired by the distance sensor can be real-time or at a specific time interval.

In the present invention, the control unit acquires the parameter of the living being entering the irradiation danger zone based on the instant distance d transmitted by the distance sensor and takes the parameter as a protection trigger condition. When the protection trigger condition is reached, the control unit controls the stage light fixture to move to eliminate the hazards, which transforms a passive light pollution defense of "label warning" used in the prior art into an autonomous regulatory defense so as to avoid effects and hazards of artificial light sources on human health.

The distance sensor is preferably provided near a light emitting opening of the light head so as to accurately acquire the instant distance from the living being to the light emitting opening, thereby better protecting the living being from effects and hazards of artificial light sources on human health. The distance sensor is an infrared sensor, an ultrasonic sensor, a laser wave sensor, or a millimeter wave sensor.

The stage light fixture includes an arm rotatably connected to the light head, and a base in rotational connection with the arm. The motor assembly includes a vertical motor for driving the light head to rotate in a vertical direction relative to the arm, and a horizontal motor for driving the arm to rotate in a horizontal direction relative to the base.

When the hazard condition reaches the parameter of the living being entering the irradiation danger zone, the control unit performs at least one of the motions that controlling the light head of the stage light fixture to change the illumination position or controlling the light source to gradually reduce power so as to eliminate the hazards. One aspect, the control unit can control the motor assembly to gradually rotate a small angle through a motor drive circuit in order to control rotation of the light head, so that the light emitted by the stage light fixture can avoid the living being for the purpose of protecting the living being. The other aspect, the control unit can control the light source to gradually reduce power through a drive circuit so that brightness can be reduced without changing color temperatures of the stage light fixture for the purpose of protecting the living being. The control unit can alternately control the light head to rotate or control the light source to gradually reduce power so as to protect the living being.

The present invention further provides a control method using the control system described above. The method includes the following steps:

S1, acquiring stage light fixture parameters: turning the stage light fixture to the brightest, and acquiring the light fixture irradiance value $E_S$ per unit of time (1 second) and distance (1 meter);

S2, sensing a biological distance: a distance sensor s11 detecting the instant distance d from the living being to the stage light fixture and transmitting the instant distance d to the control unit;

S3, acquiring the parameter of the living being entering the irradiation danger zone: searching the light radiation hazard exposure radiance limit value $E_{harm}$ corresponding to different wavelength ranges in "CIES 009/E: 2002", which is a photochemical hazard standard customized by the International Commission on Illumination (CIE), and the control unit acquiring the parameter of the living being entering the irradiation danger zone according to the instant distance d, the light radiation hazard exposure radiance limit value $E_{harm}$, and the light fixture irradiance value $E_S$; and S4, eliminating the hazards: the control unit controls the stage light fixture to move so as to eliminate the hazards when the hazard condition reaches the parameter of the living being entering the irradiation danger zone.

Specifically, in step S4, a method of eliminating the hazards adopts one of the following two modes or an alternative operation manner of the two modes.

Mode 1: avoiding the living being: the control unit controls the motor assembly to rotate through the motor drive circuit in order to rotate the light head, and the motor assembly stops rotation until an instant distance d' from the living being to the stage light fixture acquired by the distance sensor is greater than d.

Mode 2: gradually reducing power of the light source: the control unit controls the light source to reduce power through a drive circuit.

Specifically, in step S3, the parameter of the living being entering the irradiation danger zone is a maximum time $t_{max}$ during which the light is allowed to irradiate the human body. An energy expression (1) is established according to that a light radiation value is inversely proportional to the square of the distance:

$$\frac{E_s}{d^2} \cdot t \leq E_{harm}; \quad (1)$$

in which t is the irradiation time.

The maximum time $t_{max}$ during which the light is allowed to irradiate the human body is thus acquired according to Equation (1):

$$t_{max} = \frac{d^2}{E_s} \cdot E_{harm}. \quad (2)$$

In step S3, when the stage light fixture is in a dimming state, a dimming coefficient is denoted as a constant k, k∈[0-100%], and the maximum time $t_{max}$ during which the light is allowed to irradiate the human body is:

$$t_{max} = \frac{d^2}{k \cdot E_s} \cdot E_{harm}. \quad (3)$$

Preferably, when the stage light fixture has multiple primary colors, the light fixture irradiance value $E_S$ corresponding to each primary color is acquired in step S1, light radiation hazard exposure radiance limit values $E_{harm}$ of each primary color corresponding to different wavelength ranges are searched in step S3, the irradiation time corresponding to each primary color is calculated according to Equation (3), and the maximum time $t_{max}$ during which the light is allowed to irradiate the human body takes a minimum value among the irradiation time corresponding to each primary color. For example, when the stage light fixture has RGBW primary colors, each primary color parameter corresponds to the parameter in Equation (3), e.g., $k_r$, $k_g$, $k_b$, and $k_m$ correspond to k respectively; $E_r$, $E_g$, $E_b$, and $E_m$ correspond to $E_S$ respectively; $E_{r\_harm}$, $E_{g\_harm}$, $E_{b\_harm}$, and $E_{w\_harm}$ correspond to $E_{harm}$ respectively; $t_r$, $t_g$, $t_b$, and $t_w$ correspond to $t_{max}$ respectively; and the maximum time $t_{max}$ during which the light is allowed to irradiate the human body takes the minimum value among $t_r$, $t_g$, $t_b$, and $t_w$, and is denoted as $t_0$.

Preferably, when gradually reducing power of the light source to eliminate the hazards, the control unit controls the light source every 1 second to perform one power reduction; the power reduction time is denoted by $t_i$, the subscript i represents the i-th second, and an intrinsic time $t_{max}$ before action calculated by Equation (3) is denoted as a constant C, and then $$t_i = C + i (i = 0, 1, 2, \dots) \quad (4);$$

a power reduction coefficient for the i-th second is denoted as $\eta_i$, and the following equation is obtained from (3):

$$t_i = \frac{d^2}{\eta_i \cdot k \cdot E_s} \cdot E_{harm}; \quad (5)$$

the power reduction coefficient $\eta_i$ according to Equations (4) and (5) is:

$$\eta_i = \frac{d^2}{(C+i) \cdot k \cdot E_s} \cdot E_{harm} \quad (i = 0, 1, 2, \dots); \quad (6)$$

a product of the power reduction coefficient $\eta_i$ and the dimming coefficient k is the real-time power that the control unit controls the light source to reduce; if the stage light fixture has multiple primary colors, the intrinsic time $t_{max}$ before action is the minimum value among the irradiation time for each primary color, a power reduction coefficient $\eta'_i$ corresponding to each primary color is calculated according to Equation (6), a product of the power reduction coefficient $\eta'_i$ and the dimming coefficient k corresponding to each primary color is the real-time power that the control unit controls each primary color of the light source to reduce; for example, when the stage light fixture has RGBW primary colors, the shortest time $t_0$ described above is obtained and is substituted into Equation (6) with each primary parameter (i.e., $k_r$, $k_g$, $k_b$, and $k_m$ correspond to k respectively; $E_r$, $E_g$, $E_b$, and $E_m$ correspond to $E_S$ respectively; $E_{r\_harm}$, $E_{g\_harm}$, $E_{b\_harm}$, and $E_{w\_harm}$ Correspond to $E_{harm}$ respectively) so as to obtain the power reduction coefficient $\eta'_i$ for each primary color, and finally $\eta'_i$ is multiplied and applied with $k_r$, $k_g$, $k_b$, and $k_m$ respectively, and it is possible to gradually reduce the brightness in a dynamic and real-time manner without changing the color temperatures.

Compared with the prior art, some beneficial effects of the present invention can be obtained.

1. The control unit acquires the parameter of the living being entering the irradiation danger zone based on the instant distance d transmitted by the distance sensor and takes the parameter as a protection trigger condition. When the protection trigger condition is reached, the control unit controls the stage light fixture to move to eliminate the hazards, which transforms the passive light pollution defense of "label warning" used in the prior art into an autonomous regulatory defense so as to avoid effects and hazards of artificial light sources on human health.

2. The control system automatically senses a human body distance, and can automatically eliminate the hazards of excessive light pollution without manual intervention when the human body is in a dangerous zone.

3. The control system automatically eliminates the hazards adopts a dynamically gradual changing manner, which has a minimum effect on performance of the stage light fixture.

DETAILED DESCRIPTION

Figure 1:
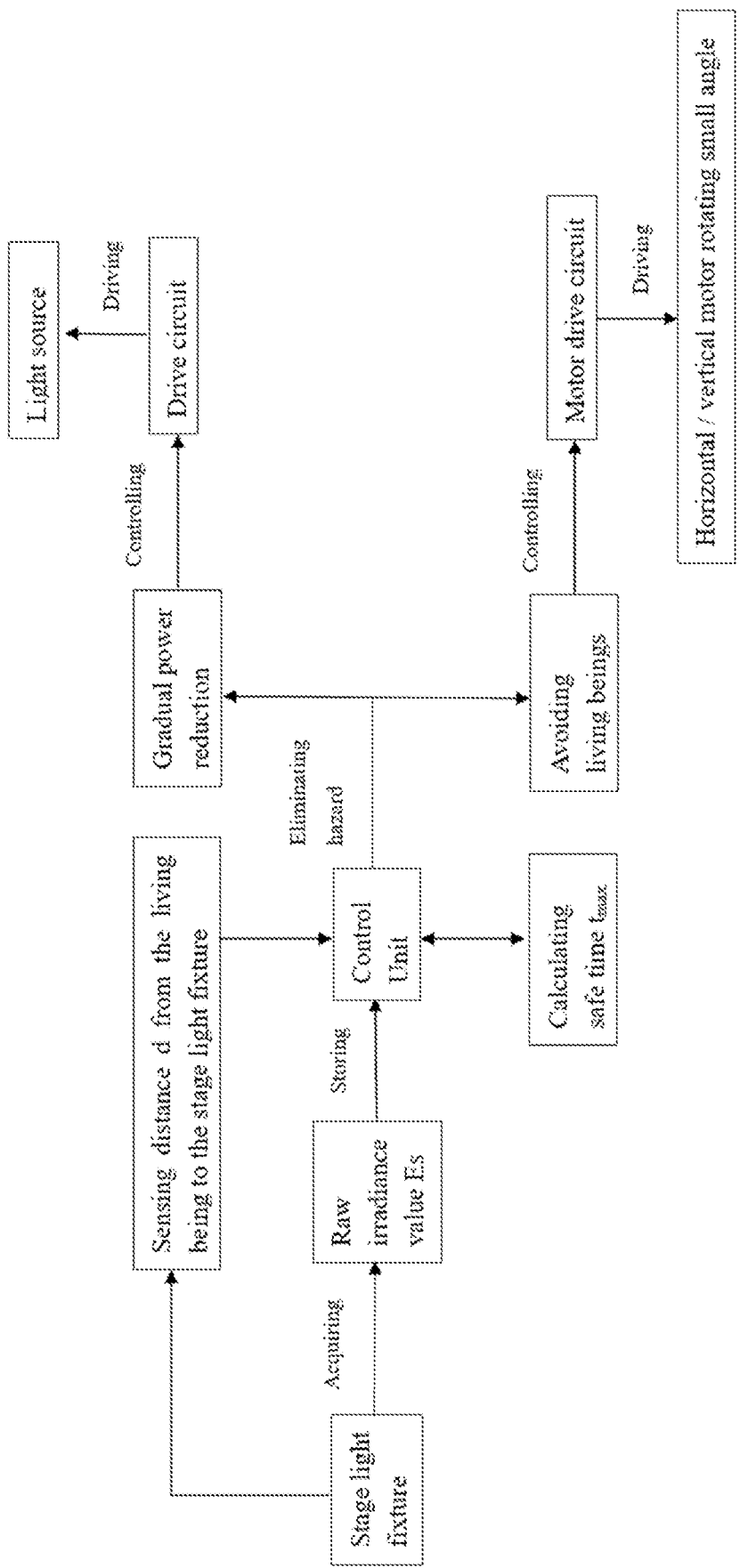
FIG. 1 is a block diagram showing a principle of a control system for a stage light fixture having photobiological safety according to an embodiment.

The drawings are in the present invention are for illustrative purposes only and are not to be construed as limiting the present invention. For better illustrating the following embodiments, some parts in the drawings may be omitted, enlarged, or reduced, and sizes of these parts do not represent that of actual products. For those skilled in the art, it will be understood that some known structures and descriptions thereof in the drawings may be omitted.

As shown in FIG. 1, which is a block diagram showing a principle of a control system for a stage light fixture having photobiological safety according to an embodiment. The control system includes a control unit s31 and a distance sensor s11 connected to the control unit. The stage light fixture includes a light head s1 within which a light source s13 is provided, and a motor assembly for driving the light head s1 to change an illumination position, in which the control unit s31 is connected to the motor assembly and the light source s13 and used to control the stage light fixture to operate. The distance sensor s11 is provided on the light head s1 and used to acquire an instant distance d from a living being to the stage light fixture. The control unit s31 stores a light radiation hazard exposure radiance limit value $E_{harm}$ and a light fixture irradiance value $E_S$ acquired in advance per unit of time and distance. The control unit s31 acquires a parameter of the living being entering an irradiation danger zone according to the instant distance d, the light radiation hazard exposure radiance limit value $E_{harm}$, and the light fixture irradiance value $E_S$, and the control unit s31 controls the stage light fixture to move so as to eliminate hazards when a hazard condition reaches the parameter of the living being entering the irradiation danger zone.

The stage light fixture control system can also be applied to LED lights, laser lights, and searchlights so as to avoid effects and hazards of artificial light sources on human health. The light head changes the illumination position by rotation or translation of the light head. The instant distance d from the living being to the stage light fixture acquired by the distance sensor can be real-time or at a specific time interval.

In the present invention, the control unit s31 acquires the parameter of the living being entering the irradiation danger zone based on the instant distance d transmitted by the distance sensor s11 and takes the parameter as a protection trigger condition. When the protection trigger condition is reached, the control unit controls the stage light fixture to move to eliminate the hazards, which transforms the passive light pollution defense of "label warning" used in the prior art into an autonomous regulatory defense so as to avoid effects and hazards of artificial light sources on human health.

Figure 2:
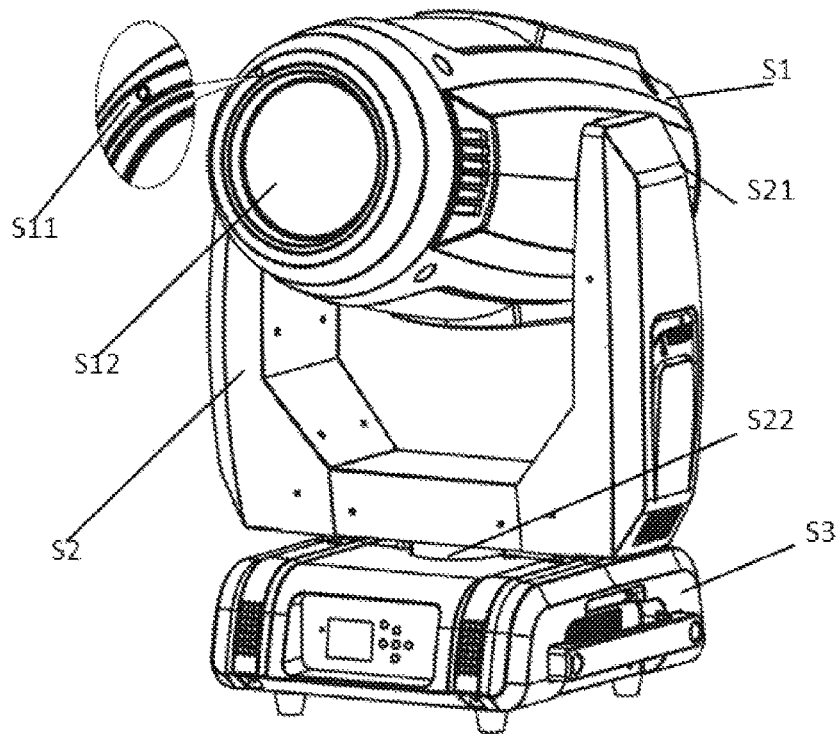
FIG. 2 is a schematic structural diagram of a stage light fixture according to the present embodiment.

As shown in FIG. 2, the distance sensor s11 is provided near a light emitting opening s12 of the light head s1 so as to accurately acquire the instant distance from the living being to the light emitting opening s12, thereby better protecting the living being from effects and hazards of artificial light sources on human health. The distance sensor s11 is preferably an infrared sensor, an ultrasonic sensor, a laser wave sensor, or a millimeter wave sensor.

In addition, as shown in FIG. 2, the stage light fixture further includes an arm s2 rotatably connected to the light head s1, and a base s3 in rotational connection with the arm s2. The motor assembly includes a vertical motor s21 for driving the light head s1 to rotate in a vertical direction relative to the arm s2, and a horizontal motor s22 for driving the arm s2 to rotate in a horizontal direction relative to the base s3. The control unit s31 is provided in the base s3.

Figure 3:
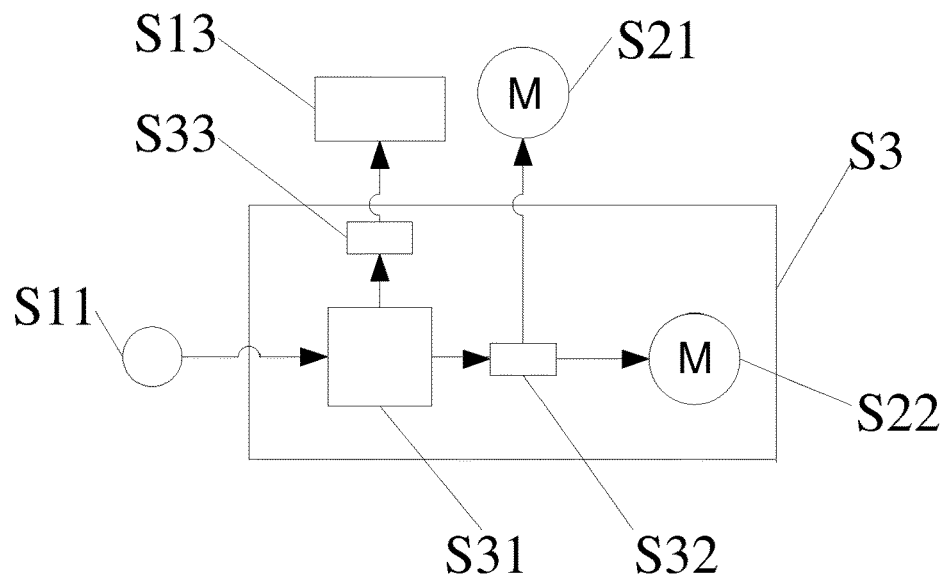
FIG. 3 is a structural block diagram of the control system according to the present embodiment.
Figure 4:
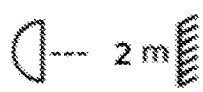
FIG. 4 is a "label warning" marking graph according to a prior art.

In the present embodiment, as shown in FIG. 3, when the hazard condition reaches the parameter of the living being entering the irradiation danger zone, the control unit s31 performs at least one of the motions that controlling the light head s1 of the stage light fixture to change the illumination position or controlling the light source s13 to gradually reduce power so as to eliminate the hazards. The control unit s31 controls the motor assembly to gradually rotate a small angle through a motor drive circuit s32 in order to control rotation of the light head s1, so that the light emitted by the stage light fixture can avoid the living being for the purpose of protecting the living being. The control unit s31 can also control the light source s13 to gradually reduce power through a source drive circuit s33 so that brightness can be reduced without changing color temperatures of the stage light fixture for the purpose of protecting the living being. The control unit s31 can alternately control the light head s1 to rotate or control the light source s13 to gradually reduce power so as to protect the living being.

The present embodiment further provides a control method using the control system described above. The method includes the following steps:

S1, acquiring stage light fixture parameters: turning the stage light fixture to the brightest, and acquiring the light fixture irradiance value $E_S$ per unit of time (1 second) and distance (1 meter);

S2, sensing a biological distance: a distance sensor s11 detecting the instant distance d from the living being to the stage light fixture and transmitting the instant distance d to the control unit;

S3, acquiring the parameter of the living being entering the irradiation danger zone: searching the light radiation hazard exposure radiance limit value $E_{harm}$ corresponding to different wavelength ranges in "CIES 009/E: 2002", which is a photochemical hazard standard customized by the International Commission on Illumination (CIE), and the control unit acquiring the parameter of the living being entering the irradiation danger zone according to the instant distance d, the light radiation hazard exposure radiance limit value $E_{harm}$, and the light fixture irradiance value $E_S$; and S4, eliminating the hazards: the control unit s31 controls the stage light fixture to move so as to eliminate the hazards when the hazard condition reaches the parameter of the living being entering the irradiation danger zone.

In step S4, a method of eliminating the hazards adopts one of the following two modes or an alternative operation manner of the two modes.

Mode 1: avoiding a living being: the control unit s31 controls the motor assembly to rotate through the motor drive circuit s32 in order to rotate the light head, and the motor assembly stops rotation until an instant distance d' from the living being to the stage light fixture acquired by the distance sensor is greater than d.

Mode 2: gradually reducing power of the light source: the control unit s31 controls the light source to reduce power through a source drive circuit s33.

In addition, in step S3, the parameter of the living being entering the irradiation danger zone is a maximum time $t_{max}$ during which the light is allowed to irradiate the human body. An energy expression (1) is established according to that a light radiation value is inversely proportional to the square of the distance:

$$\frac{E_s}{d^2} \cdot t \leq E_{harm}; \tag{1}$$

in which t is the irradiation time.

the maximum time $t_{max}$ during which the light is allowed to irradiate the human body is acquired according to Equation (1):

$$t_{max} = \frac{d^2}{E_s} \cdot E_{harm}. \tag{2}$$

In step S3, when the stage light fixture is in a dimming state, a dimming coefficient is denoted as a constant k, k☐∈ [0-100%], and the maximum time $t_{max}$ during which the light is allowed to irradiate the human body is:

$$t_{max} = \frac{d^2}{k \cdot E_s} \cdot E_{harm}. \tag{3}$$

In addition, when the stage light fixture has multiple primary colors, the light fixture irradiance value $E_S$ corresponding to each primary color is acquired in step S1, light radiation hazard exposure radiance limit values $E_{harm}$ of each primary color corresponding to different wavelength ranges are searched in step S3, the irradiation time corresponding to each primary color is calculated according to Equation (3), and the maximum time $t_{max}$ during which the light is allowed to irradiate the human body takes a minimum value among the irradiation time corresponding to each primary color. For example, when the stage light fixture has RGBW primary colors, each primary color parameter corresponds to the parameter in Equation (3), e.g., $k_r$, $k_g$, $k_b$, and $k_m$ correspond to k respectively; $E_r$, $E_g$, $E_b$, and $E_w$ correspond to $E_S$ respectively; $E_{r\_harm}$, $E_{g\_harm}$, $E_{b\_harm}$, and $E_{w\_harm}$ correspond to $E_{harm}$ respectively; $t_r$, $t_g$, $t_b$, and $t_w$ correspond to $t_{max}$ respectively; and the maximum time $t_{max}$ during which the light is allowed to irradiate the human body takes the minimum value among $t_r$, $t_g$, $t_b$, and $t_w$, and is denoted as $t_0$.

When gradually reducing power of the light source to eliminate the hazards, the control unit controls the light source every 1 second to perform one power reduction; the power reduction time is denoted by $t_i$, the subscript i represents the i-th second, and an intrinsic time $t_{max}$ before action calculated by Equation (3) is denoted as a constant C, and then $$t_i = C + i (i=0,1,2, \dots) \tag{4};$$

a power reduction coefficient for the i-th second is denoted as $\eta_i$, and the following equation is obtained from (3):

$$t_i = \frac{d^2}{\eta_i \cdot k \cdot E_s} \cdot E_{harm}; \tag{5}$$

the power reduction coefficient $\eta_i$ according to Equations (4) and (5) is:

$$\eta_i = \frac{d^2}{(C+i) \cdot k \cdot E_s} \cdot E_{harm} \quad (i = 0, 1, 2, \dots); \tag{6}$$

a product of the power reduction coefficient $\eta_i$ and the dimming coefficient k is the real-time power that the control unit controls the light source to reduce;

if the stage light fixture has multiple primary colors, the intrinsic time $t_{max}$ before action is the minimum value among the irradiation time for each primary color, a power reduction coefficient $\eta'_i$ corresponding to each primary color is calculated according to Equation (6), a product of the power reduction coefficient $\eta'_i$ and the dimming coefficient k corresponding to each primary color is the real-time power that the control unit controls each primary color of the light source to reduce; for example, when the stage light fixture has RGBW primary colors, the shortest time $t_0$ described above is obtained and is substituted into Equation (6) with each primary parameter (i.e., $k_r$, $k_g$, $k_b$, and $k_m$ correspond to k respectively; $E_r$, $E_g$, $E_b$, and $E_m$ correspond to $E_S$ respectively; $E_{r\_harm}$, $E_{g\_harm}$, $E_{b\_harm}$, and $E_{w\_harm}$ correspond to $E_{harm}$ respectively) so as to obtain the power reduction coefficient $\eta'_i$ for each primary color, and finally $\eta'_i$ is multiplied and applied with $k_r$, $k_g$, $k_b$, and $k_m$ respectively, and it is possible to gradually reduce the brightness in a dynamic and real-time manner without changing the color temperatures.

Obviously, the above embodiments of the present invention are merely examples for clear illustration of the technical solution in the present invention, and are not intended to limit the implementations of the present invention. Any modification, equivalent substitution, improvement or the like within the spirit and principle of the present invention should be included in the scope of the claims of the present invention.

The invention claimed is:

1. A control system for a stage light fixture with photobiological safety, the stage light fixture includes a light head within which a light source is provided, and a motor assembly for driving the light head to change an illumination position, the control system comprising:
   a control unit connected to the motor assembly and the light source and configured to control the stage light fixture to operate, and
   a distance sensor connected to the control unit, the distance sensor being provided on the light head and configured to acquire an instant distance d from a living being to the stage light fixture,
   wherein the control unit is configured to store a light radiation hazard exposure radiance limit value $E_{harm}$ and a light fixture irradiance value $E_S$ acquired in advance per unit of time and distance, and to acquire a parameter of the living being entering an irradiation danger zone according to the instant distance d, the light radiation hazard exposure radiance limit value $E_{harm}$, and the light fixture irradiance value $E_S$,
   when a hazard condition reaches the parameter of the living being entering the irradiation danger zone, the control unit controls the stage light fixture to move to eliminate the hazard condition, and
   wherein the parameter of the living being entering the irradiation danger zone is a maximum time $t_{max}$ during which the light fixture is allowed to irradiate the living being, the maximum time $t_{max}$ satisfies $$t_{max} = \frac{d^2}{E_s} \cdot E_{harm}.$$

2. The control system according to claim 1, wherein the distance sensor is in form of an infrared sensor, an ultrasonic sensor, a laser wave sensor, or a millimeter wave sensor.

3. The control system according to claim 1, wherein the stage light fixture includes an arm rotatably connected to the light head, and a base in rotational connection with the arm, and wherein the motor assembly includes a vertical motor for driving the light head to rotate in a vertical direction relative to the arm, and a horizontal motor for driving the arm to rotate in a horizontal direction relative to the base.

4. The control system according to claim 1, wherein when the hazard condition reaches the parameter of the living being entering the irradiation danger zone, the control unit performs at least one of the motions that controlling the light head of the stage light fixture to change the illumination position or controlling the light source to gradually reduce power to eliminate the hazard condition.

5. A control method for a stage light fixture having photobiological safety, comprising the steps of:
   S1, acquiring parameters of the stage light fixture: acquiring a light fixture irradiance value $E_S$ per unit of time and distance;
   S2, sensing a biological distance: the distance sensor detecting an instant distance d from a living being to the stage light fixture and transmitting the instant distance d to a control unit;
   S3, acquiring a parameter of the living being entering the irradiation danger zone: searching a light radiation hazard exposure radiance limit value $E_{harm}$ corresponding to different wavelength ranges, the control unit acquiring the parameter of the living being entering the irradiation danger zone according to the instant distance d, the light radiation hazard exposure radiance limit value $E_{harm}$, and the light fixture irradiance value $E_S$, and
   S4, eliminating a hazard condition: the control unit controlling the stage light fixture to move to eliminate the hazard condition when the hazard condition reaches the parameter of the living being entering the irradiation danger zone,
   wherein the parameter of the living being entering the irradiation danger zone is a maximum time $t_{max}$ during which the light fixture is allowed to irradiate the living being, which is obtained from an energy expression (1) established according to that a light fixture radiation value is inversely proportional to a square of the instant distance d:

$$\frac{E_s}{d^2} \cdot t \le E_{harm} \quad (1)$$

in which t is an irradiation time that the light fixture irradiates the living being, so that the maximum time $t_{max}$ during which the light fixture is allowed to irradiate the human body is acquired according to Equation (1):

$$t_{max} = \frac{d^2}{E_s} \cdot E_{harm}. \quad (2)$$

6. The control method according to claim 5, wherein a method of eliminating the hazard condition in S4 adopts one of the following two modes or an alternative operation manner of the two modes:
   mode 1 is avoiding the living being, in which the control unit controls the motor assembly to rotate through a motor drive circuit to rotate the light head until an instant distance d' from the living being to the stage light fixture acquired by the distance sensor is greater than d; and
   mode 2 is gradually reducing power of the light source, in which the control unit controls the light source to reduce power through a drive circuit.

7. The control method according to claim 5, wherein in step S3, when the stage light fixture is in a dimming state, a dimming coefficient is denoted as a constant k, k∈[0-100%], and the maximum time $t_{max}$ during which the light fixture is allowed to irradiate the living being is acquired according to Equation:

$$t_{max} = \frac{d^2}{k \cdot E_s} \cdot E_{harm}. \quad (3)$$

8. The control method according to claim 7, wherein when the stage light fixture has multiple primary colors, the light fixture irradiance value $E_S$ corresponding to each primary color is acquired in step S1, light radiation hazard exposure radiance limit values $E_{harm}$ of each primary color corresponding to different wavelength ranges are searched in step S3, the irradiation time corresponding to each primary color is calculated according to Equation (3), and the maximum time $t_{max}$ during which the light fixture is allowed to irradiate the living being takes a minimum value among the irradiation time corresponding to each primary color.

9. The control method according to claim 7, wherein when gradually reducing power of the light source to eliminate the hazard condition, the control unit controls the light source every one second to perform a power reduction, a power reduction time is denoted by $t_i$, a subscript i represents an i-th second, and the maximum time $t_{max}$ before action calculated by Equation (3) is denoted as a constant C, $t_i$ satisfies $$t_i = C + i (i=0,1,2,\ldots) \tag{4}$$

a power reduction coefficient for the i-th second is denoted as $\eta_i$, and the following equation is obtained from (3):

$$t_i = \frac{d^2}{\eta_i \cdot k \cdot E_s} \cdot E_{harm}; \tag{5}$$

the power reduction coefficient $\eta_i$ according to Equations (4) and (5) is:

$$\eta_i = \frac{d^2}{(C+i) \cdot k \cdot E_s} \cdot E_{harm} \quad (i = 0, 1, 2, \ldots); \tag{6}$$

a product of the power reduction coefficient $\eta_i$ and the dimming coefficient k is a real-time power that the control unit controls the light source to reduce.

10. The control method according to claim 8, wherein if the stage light fixture has multiple primary colors, the maximum time $t_{max}$ before action is the minimum value among the irradiation time for each primary color, a power reduction coefficient $\eta'_i$ corresponding to each primary color is calculated according to Equation (6), a product of the power reduction coefficient $\eta'_i$ and the dimming coefficient k corresponding to each primary color is a real-time power that the control unit controls each primary color of the light source to reduce.

* * * * *